US005224682A

United States Patent [19]

Baughman

[11] Patent Number: 5,224,682

[45] Date of Patent: Jul. 6, 1993

[54] DRILL HOLDING MECHANISM

[76] Inventor: James A. Baughman, 761 S. 1200 East, Salt Lake City, Utah 84102

[21] Appl. No.: 751,740

[22] Filed: Aug. 29, 1991

[51] Int. Cl.[5] .............................................. F16M 13/00

[52] U.S. Cl. ..................................... 248/651; 248/669

[58] Field of Search ............... 248/656, 657, 669, 651, 248/405, 297.2, 295.1, 298, 316.6, 647, 662, 92; 51/166 R, 166 TS, 166 FB; 408/712, 21, 20, 110, 111; 144/1 F, 35 R, 104, 84

[56] References Cited

U.S. PATENT DOCUMENTS

| | | | |
|---|---|---|---|
| 1,741,044 | 12/1929 | Whipple et al. | 408/111 X |
| 1,832,938 | 11/1931 | Leach | 248/669 X |
| 2,463,266 | 3/1949 | Habenicht | 408/111 |
| 2,580,398 | 1/1952 | Braswell | 408/111 X |
| 2,719,461 | 10/1955 | Hawker | 408/111 |
| 2,888,965 | 6/1959 | Phillips | 248/669 X |
| 3,853,420 | 12/1974 | Abell | 408/110 X |
| 4,080,092 | 3/1978 | Hudson | 408/110 |
| 4,932,814 | 6/1990 | York | 408/111 X |
| 5,006,022 | 4/1991 | Miller | 408/110 X |
| 5,051,044 | 9/1991 | Allen | 408/111 X |

FOREIGN PATENT DOCUMENTS

| | | | |
|---|---|---|---|
| 2223182 | 11/1973 | Fed. Rep. of Germany | 248/651 |
| 129216 | 8/1950 | Sweden | 248/651 |

*Primary Examiner*—Karen J. Chotkowski

*Attorney, Agent, or Firm*—Trask, Britt & Rossa

[57] ABSTRACT

An air drill holding mechanism has a support member, a workpiece mount, a drill mount, and a guide and feed means. The support member is mounted to a bracket for mounting the support to a work piece, and supports an air drill in position for drilling into a work piece. The drill mount is mounted to the support member and clamps an air drill to the mechanism. The guide and feed means is also mounted to the support member and functions to feed and guide the drill into the workpiece.

13 Claims, 6 Drawing Sheets

DRILL HOLDING MECHANISM

BACKGROUND OF THE INVENTION

1. Field

This application relates to portable structures for mounting drills in fixed position for operation, and more specifically, to portable means to secure a drill in an adjustable position for drilling into a workpiece, especially heavy-duty internal combustion engines.

2. State of the Art

Many common machine shop jobs, such as removing broken or sheared bolts and threading bolt holes, require drilling operations. A problem sometimes encountered in these jobs is the difficulty in bringing the workpiece to a drilling mechanism such as a drill press. A workpiece may be very large or heavy, or may be in a remote location such as in building erection, so that considerable effort is required to move the workpiece to the drilling mechanism. Further, if the workpiece is very massive, it may not fit under the drilling head of a typical drilling mechanism.

Mounting an irregularly shaped workpiece to a conventional drilling mechanism may also be problematic. The workpiece may have a shape making it difficult or impossible to mount the workpiece in position for drilling. In some instances, the drill site may be partially obstructed or concealed so that conventional drilling techniques are not possible. Such a problem exists if a drilling operation is required on the underside of a piece of machinery or equipment.

Many workpieces requiring drilling operations are components of a larger assembly. Conventional drilling mechanisms require that either the entire assembly be moved to the drill, or the component be removed from the assembly and brought to the drill. In some instances, for example a cylinder head on an automobile or truck engine, either of these options is laborious. If the drilling operation is on a component of a machine tool used in a production setting, expensive down-time may be incurred while the machine is disassembled and brought to the drilling apparatus.

It would be preferable in these and other situations, to bring the drilling mechanism to the workpiece instead of vice versa. Machines could be left in an assembled position while the drilling operation is performed at the machine site. Heavy duty equipment could be repaired in the field rather than transporting the equipment to a repair shop. If a component of an assembly required a drilling operation, disassembly would not be required if the drilling operation could be performed with the component in the assembled position.

A mobile support for an electric drill is disclosed in U.S. Pat. No. 3,417,949 to Waber. The Waber invention adjustably mounts a drill on a wheeled carriage which can be positioned next to a workpiece. Several adjustment means are provided to position the drill for the drilling operation. The Waber invention does not mount to the workpiece, but is brought to and positioned near it so that an abutment chain can be fastened around the workpiece.

SUMMARY OF THE INVENTION

The invention described herein is a drill holding mechanism that adjustably mounts to a workpiece such as an internal combustion engine or machine tool. The portable design and simple operation of the invention make it a useful tool for on-site drilling operations. The mechanism secures a drill in the correct position for a drilling operation, and has a movable carriage to urge a drill bit into the workpiece.

The invention is particularly useful with high speed air drills. Typically, air drills are small, lightweight, and have variable speed and reversible capabilities, making them ideal for jobs requiring portable tools. The RPM of an air drill also winds down rapidly when the air supply is cut-off. Rapid wind-down is important when the drill is used in a confined area because if the drilling tool "catches" in the workpiece, the drill may be stopped almost immediately by releasing the air trigger or actuating mechanism. By contrast, when the power is cut-off to an electric drill, the drill continues to rotate for several seconds during which time the drill may spin around and injure the worker.

Air drills are seldom mounted in a drill press configuration, and the present invention provides means to mount an air drill in an inverted position so it can be operated in a manner similar to a drill press. The air drill holding mechanism herein disclosed allows a user to obtain the convenience and RPM advantages of an air drill in combination with the accuracy and safety of a fixably mounted drill.

In one embodiment, the drill holding mechanism adjustably mounts to a workpiece by means of a mounting means comprising a swivel mounting bracket. The swivel mounting bracket includes means to adjust the vertical angle of the drill holding mechanism with respect to a workpiece. A slot in the bracket allows a mounting bolt to be passed through the mount and into the workpiece to secure the mechanism to the workpiece. Horizontal positional adjustment can be achieved by moving the mechanism so the bolt slides through the slot in the mounting bracket. Tightening the mounting bolt secures the drill holding mechanism to the workpiece. The mounting bracket may also be secured to the workpiece by means of a C-clamp or other suitable clamping device.

The swivel mounted embodiment is particularly useful when a drilling operation is performed in a surface other than the surface to which the bracket is mounted. For example, the drill holding mechanism can be mounted to the block of an internal combustion engine and adjusted to drill out and rethread a stripped bolt hole on another surface of the engine.

In another embodiment, the drill holding mechanism mounts to a workpiece by means of a mounting means comprising a fixed bracket. The bracket may be secured to the workpiece by means of a bolt, clamp, or other suitable fastener. A slot in the fixed bracket allows the mechanism to be adjustably positioned in a similar manner as the swivel bracket. The vertical position of the drill holding mechanism, however, is fixed in this embodiment. This embodiment is useful where the drill holding mechanism can be mounted to same surface in which the drilling operation is to take place. For example, the drill holding mechanism can be mounted to the flat surface above the cylinders of an internal combustion engine. A broken head bolt can be drilled out, and the hole rethreaded, while the engine remains mounted in the vehicle.

The drill holding mechanism has a support member connected to the mounting bracket. The support member extends from the mounting bracket to support a drill in a position generally perpendicular to the surface of the workpiece. The adjustable mounting bracket embodiment allows the vertical angle position of the support member, relative to the surface of the workpiece, to be adjusted. The support member is structured so that other components of the drill holding mechanism may be mounted thereto.

A drill may be mounted to the drill holding mechanism by means of a drill mounting bracket comprising a split yoke structured to clamp to the drill housing below the drill chuck. Bolts are passed through the two yoke halves, and tightened to clamp the drill securely to the mechanism. With the drill secured to the mechanism, and the mechanism positioned and bolted to the workpiece, the drill is thus securely mounted to the workpiece, and in position for drilling. The drill may be mounted in an inverted position, for drilling into the mounting surface, or it may be mounted in an upright position, for drilling into a workpiece opposite the mounting surface.

A drill feed means includes a movable carriage, movable along a longitudinal axis of the support member to urge the drill toward and away from a workpiece during the drilling motion. Movement of the carriage is facilitated by a threaded feed shaft mounted to the support member and movably connected to the carriage. The drill feed means functions to urge the drill toward and away from a workpiece at a smooth and steady rate. The drill feed means is guided through the drilling motion by a guide means which includes a guide member which fits closely into a recessed channel in the support member. The guide member moves vertically through the channel during the drilling motion and substantially eliminates lateral movement of the carriage. Carriage movement is thereby restricted to the vertical movement of the drilling motion.

The small size and simplicity of design make the drill holding mechanism applicable to a variety of portable drilling operations. A drill may be mounted in position to drill into a concealed or obstructed area not accessible to a drill press. By mounting the drill in an upright or inverted position, or in an angular position to the vertical, the drill holding mechanism can be used to perform drilling operations in workpieces at either end of, or various attitudes to the mechanism.

The drill holding mechanism also facilitates precise and accurate portable drilling operations. When performing a drilling operation by hand, the weight of the drill and general unsteadiness while holding the drill in position precludes accurate drilling into a workpiece. The drill holding mechanism relieves the operator from the task of holding the drill in position, and the drill feed means and drill guide member allow for smooth, precise drilling into the workpiece. Drilling operations which might otherwise require laborious handwork, and produce inaccurate results, are made simpler with the drill holding mechanism.

Drilling operations with high torque drills, when done by hand, may expose an operator to injury if the drilling tool "catches" in the workpiece. Operations such as threading bolt holes, are typically done at a low drill speed where the risk of the cutting tool "catching" in the workpiece is greater. If the cutting tool "catches", the high torque generated by some heavy-duty drill motors is sufficient to twist the users limb or wrench the drill from his hands. The drill holding mechanism, by contrast, holds a drill securely in position so that an operator is not exposed to this type of injury.

Expensive down-time during machine repair can be minimized in some instances, because the drill holding mechanism obviates the need to disassemble a machine for repair. In some instances, the drill holding mechanism may be mounted directly to the machine component, and the drilling operation performed at the machine site.

The foregoing advantages, brought about by the drill holding mechanism, make it a valuable tool to increase the accuracy, safety, and simplicity of portable drilling operations. The mechanism expands the drilling capabilities of most machine and job shops, by facilitating drilling operations in hard to reach or confined areas.

BRIEF DESCRIPTION OF THE DRAWINGS

In the drawings which illustrate what is presently regarded as the best modes for carrying out the invention.

DETAILED DESCRIPTION OF THE ILLUSTRATED EMBODIMENTS

Figure 1:
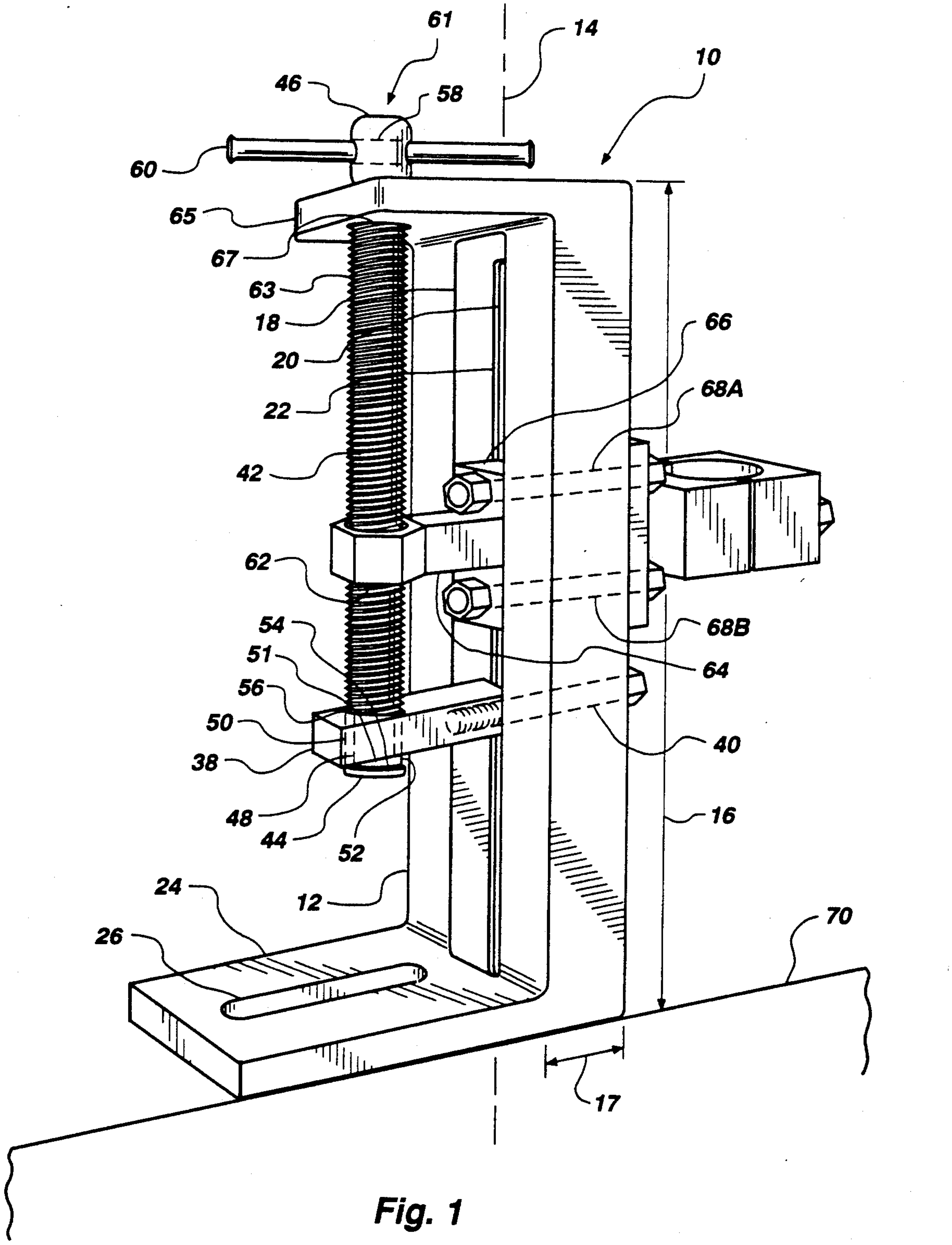
FIG. 1 is a perspective side view of a drill holding mechanism of the instant invention showing the preferred embodiment of a drill feed means.

Referring to FIG. 1, the drill holding mechanism 10 has an elongated support member 12, made from a strong structural metal such as steel, or a similarly strong and rigid material. Support member 12 has a longitudinal axis 14, a length 16, and a thickness 17. In an optimal design, length 16 is approximately 13 inches, and thickness 17 is approximately 1 inch. Dimensions 16 and 17 may vary according to structural requirements mandated by a particular application. A length of approximately 13 inches is optimal when using a typically sized air drill, while a thickness of approximately 1 inch provides sufficient structural rigidity for most drilling applications. Length 16 may also vary according to the drill size the user wishes to mount to the device. A very large drill may require that length 16 be greater than approximately 13 inches so the drill can be properly positioned with respect to a workpiece.

Figure 2:
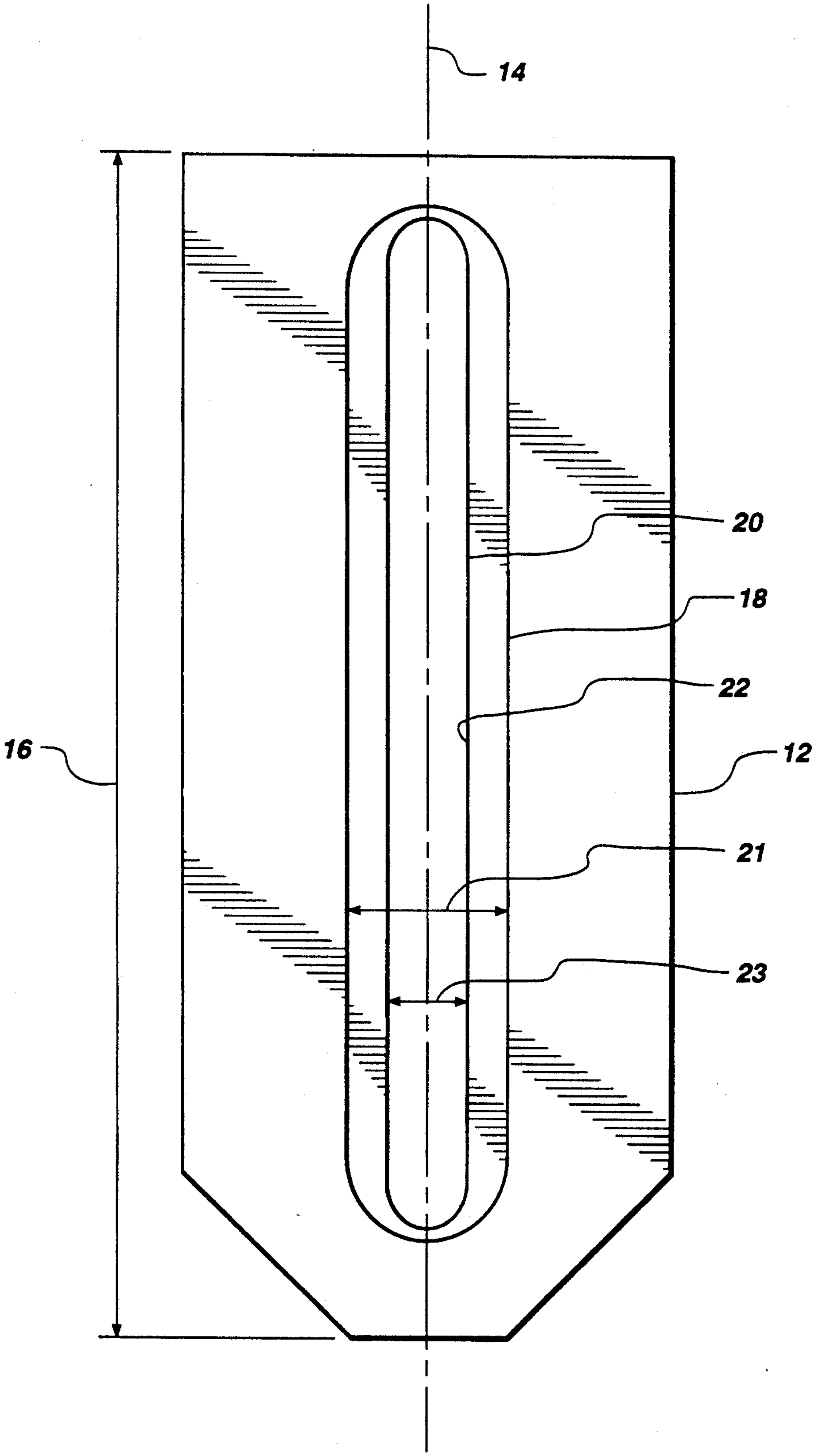
FIG. 2 is a front elevation view of the support member.
Figure 3:
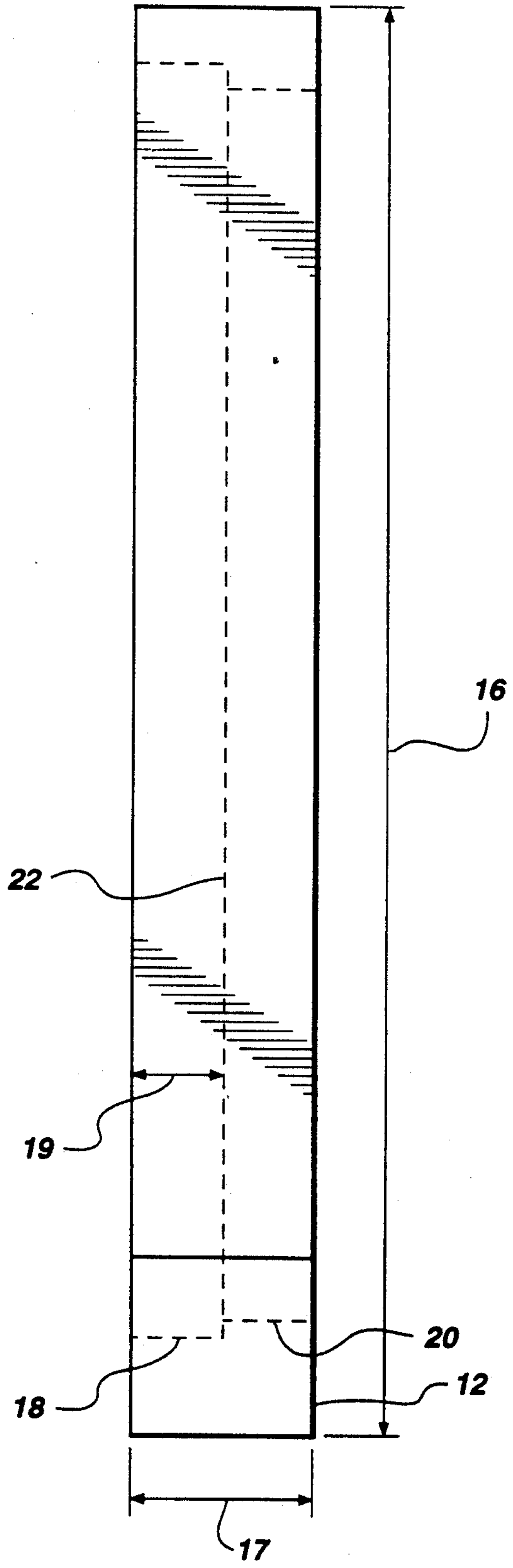
FIG. 3 is a side elevation view of the support member.

Referring to FIGS. 1, 2, and 3, support member 12 has a recessed channel 18 with a longitudinal centerline coaxial with longitudinal axis 14. Recessed channel 18 extends substantially the length 16 of support member 12 and extends along longitudinal axis 14. In an optimal design, the depth 19 of recessed channel 18 is approximately ½ inch or approximately one half of thickness 17. Depth 19 should not be so deep that the structural integrity of support member 12 is compromised. The width 21 of channel 18 in the optimal embodiment is preferably slightly greater than 1 inch.

A longitudinal first slot 20 is disposed within recessed channel 18, and extends through the remaining portion of thickness 17 so as to form a passageway through the thickness of support member 12. Longitudinal first slot 20 has a width 23 less than the width of recessed channel 18 thereby defining a shoulder 22 inside channel 18. In the optimal design, the width 23 of longitudinal slot 20 is sufficient to provide clearance fit for bolts 68A and 68B to be passed through the slot. Recessed channel 18 and longitudinal first slot 20 are part of a guide means which will be discussed when its function will be more clear. In an alternate embodiment, first slot 20 extends through the entire thickness of support member 12 and recessed channel 18 is not included.

Referring again to FIG. 1, in a first embodiment, a workpiece mounting means includes mounting attachment member 24 extending from support member 12. Ideally, mounting attachment 24 should be positioned generally perpendicular to longitudinal axis 14 but may be positioned otherwise for specific applications. Mounting attachment 24 may be welded, bolted, or secured in some other suitable manner to support member 12. A second slot 26 extends through the thickness of workpiece attachment 24, forming a bolt passage to facilitate mounting the mechanism to a workpiece by means of a through bolt. The width of slot 26 is sufficient to provide a clearance fit for a bolt having a suitable diameter for the particular application. In an alternate configuration, more than one slot may be disposed in the mounting attachment.

Figure 4:
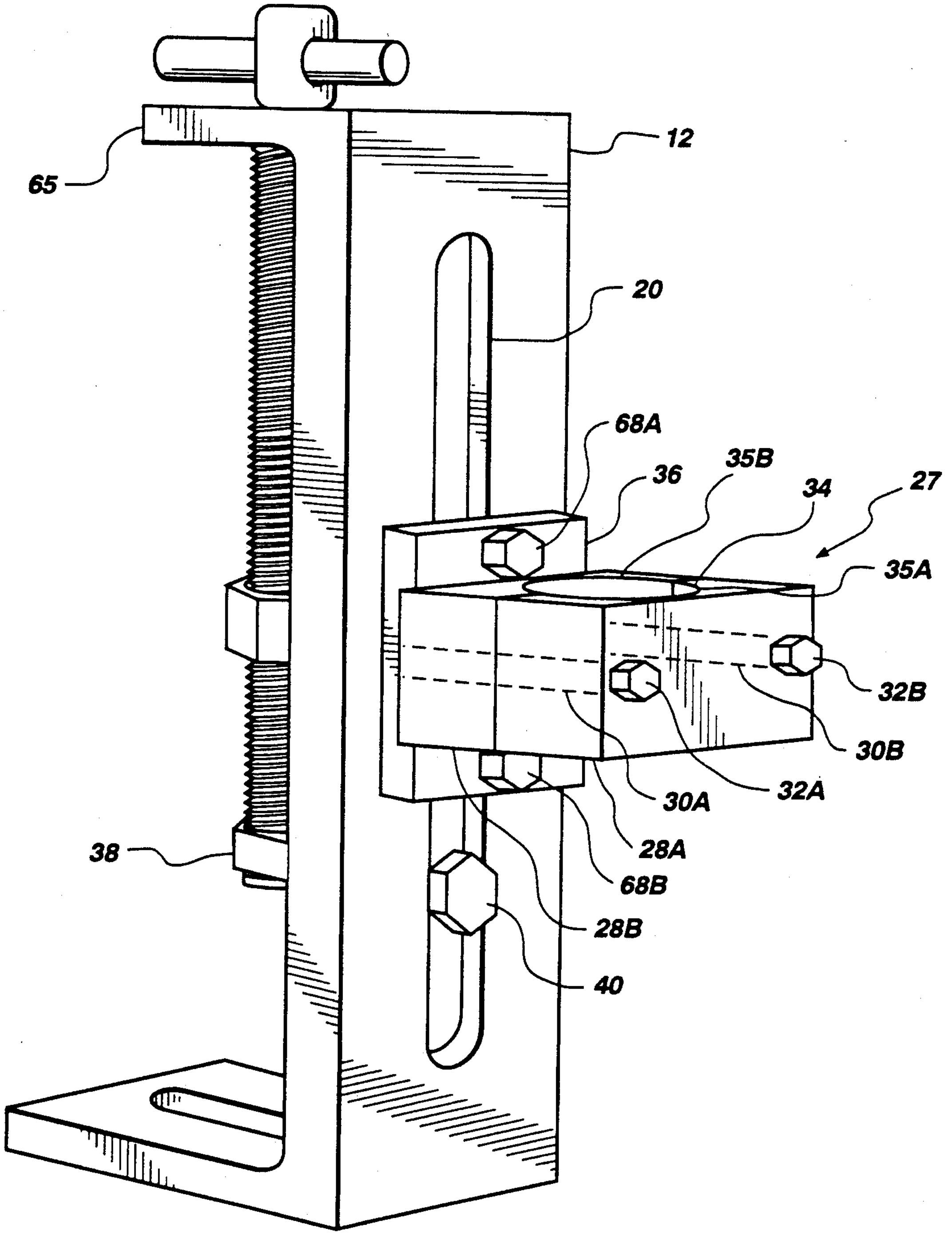
FIG. 4 is a perspective side view of a drill holding mechanism of the instant invention showing an optimal arrangement of a drill mounting bracket.
Figure 5:
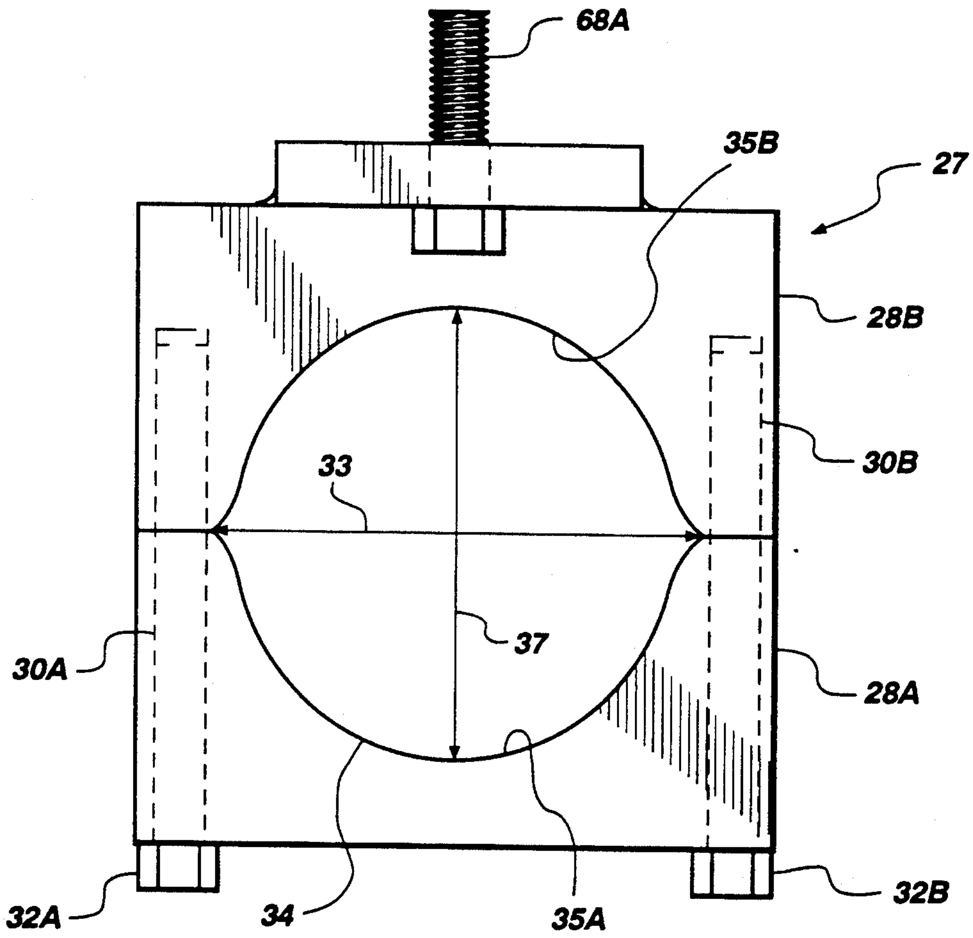
FIG. 5 is a plan view of an optimal arrangement of a drill mounting bracket.

Referring to FIGS. 4 and 5, a split yoke drill mounting bracket, indicated generally as 27, includes yoke halves 28A and 28B. In an optimal design, the drill mounting bracket 27 is a heavy-duty structure having a thickness greater than 1 inch. A pair of passageways 30A and 30B extend through yoke halves 28A and 28B. The portions of passageways 30A and 30B residing within yoke half 28B are threaded to receive bolts 32A and 32B while the portions of the passageways within yoke half 28A are a clearance fit for the bolts. Structured as such, the bolts may be tightened to secure the yoke halves together.

When yoke halves 28A and 28B are brought together, an aperture 34 is defined by the union of yoke arches 35A and 35B in each yoke half. Aperture 34 is sized and structured to fit over the exterior of a drill housing and clamp the drill by means of an interference fit between the drill housing and yoke arches 35A and 35B. In an optimal design, aperture 34 is slightly oval shaped with a diameter of approximately 2 inches at the wider portion and approximately 1¾ inches at the narrower portion. With yoke halves 28A and 28B brought together so they touch and define aperture 34, the larger diameter of the aperture is preferably the aperture diameter between passageways 30A and 30B, indicated by reference numeral 33, while the smaller diameter is the distance between the roofs of opposing yoke arches 35A and 35B, as indicated by reference numeral 37. Structuring aperture 34 according to these dimensions functions to permit the drill mounting bracket to mount several sizes of drill housings. Drills with a housing diameter between 1¾ inches and 2 inches can be mounted to the drill mounting bracket. Drills having a smaller housing diameter mount in aperture 34 by means of an interference fit between the housing and aperture 34 along diameter 37. Drills having a larger housing diameter mount by means of an interference fit while yoke arches 35A and 35B space apart along diameter 37 to accommodate the additional housing diameter. A mounting plate 36 is attached to the exterior of yoke half 28B to facilitate attachment of the drill mounting bracket 27 to the drill holding mechanism 10.

Referring to FIGS. 1 and 4, an optimal arrangement of a drill feed means includes a feedshaft abutment member 38, a feedshaft 42, and a moveable carriage 62. The abutment member is structured to fit snugly into recessed channel 18, and reside against shoulder 22. Abutment member 38 adjustably attaches to support member 12 by means of bolt 40 extending through slot 20, and threading into a threaded hole (not shown) in the abutment member. By loosening bolt 40, abutment member 38 may be moved into any position along recessed channel 18 thus providing for adjustable positioning of the drill feed means longitudinally along support member 12.

Feedshaft 42 has a proximal end 44, a distal end 46, an external threaded surface substantially along its length, and a journaled portion 48, structured to extend through a journal passageway 50 in feedshaft abutment member 38. In an optimal design, feedshaft 42 is of heavy-duty construction, with a diameter of approximately 1 inch. The portion of feedshaft 42 between a T-handle, indicated generally as 61, and journaled portion 48 is threaded with a course male thread 63, suitable for use as a feed thread. A shoulder 56 on feedshaft 42 rests against the surface of abutment member 38, thereby defining an abutting relationship between feedshaft 42 and abutment member 38. Proximal end 44 of feedshaft 42 extends through journal passageway 50, and is secured to abutment member 38 by means of washer 51 and cotter pin 52, inserted through a pin passageway 54 at the proximal end 44 of the feedshaft. A rotatable attachment of feedshaft 42 to abutment member 38 is thus defined where abutment member 38 is sandwiched between shoulder 56 and washer 51 and journaled portion 48 is rotatable within journal passageway 50. When secured to abutment member 38, feedshaft 42 is positioned parallel to support member 12. A feedshaft support 65 has an aperture 67 structured to receive distal end 46 of feedshaft 42 in a clearance fit. Feedshaft support 65 may then be secured to support member 12 to support feedshaft 42 and maintain it in the parallel relationship with support member 12.

Distal end 46 of feedshaft 42 has a handle passageway 58 structured to receive a cylindrical bar 60 into its interior, thereby forming a T-handle indicated generally as reference numeral 61. The diameter of handle passageway 58 is slightly larger the diameter of bar 60, to allow the bar to slidably move through the passageway. The ends of cylindrical bar 60 may be peened so the bar can slide from end to end, but remain in the passageway.

A movable carriage 62 is attached to a connecting bracket 64, which in turn is attached to a guide member 66. Guide member 66 is structured to fit into recessed channel 18 and reside against shoulder 22. The fit between guide member 66 and channel 18 has a clearance such that substantially all lateral movement is prevented, but movement along the longitudinal axis of channel 18 is permitted. As previously discussed, the width of channel 18 is slightly greater than 1 inch. This dimension allows for a clearance fit between guide member 66 and channel 18, when the guide member is constructed from a standard 1 inch bar stock. Structuring the channel to accept a commonly available bar stock size eliminates the need to machine fit the bar stock to the channel.

Moveable carriage 62 has a bore with female threads (not shown) structured to engage the male threads 63 on feedshaft 42. The carriage bore is designed to fit over, and thread along the length of the feedshaft. Connecting bracket 64 functions to connect carriage 62 to guide member 66, and also functions as a spacer between the carriage and the guide member. When carriage 62 is threaded over feedshaft 42, connecting bracket 64 spaces the carriage from the support member so the central axes of the carriage, feedshaft, and journal passage are coaxial. In this arrangement, rotation of feedshaft 42 causes carriage 62 to move along the threads running the length of the feedshaft.

The movable carriage 62, connecting bracket 64, and guide member 66 are slidably mounted to support member 12 by means a pair of bolts 68A and 68B which extend through slot 20 and attach guide member 66 to mounting plate 36 on drill mounting bracket 27. Guide member 66 and mounting plate 36 reside on opposite sides of support member 12, thus transferring movement of the moveable carriage 64 through slot 20 to the drill mounting bracket 27. The slidable relationship is made possible by securing a fastener to the threaded end of bolts 68A and 68B before the bolts are drawn up tight. The fastener can be a nut welded to the bolt, a nylon lock nut, or other suitable means of securing a fastener to the threaded end of bolts 68A and 68B such as peening the end of the bolt. The guide member 66 and mounting plate 36 are thus mounted in a loose enough arrangement to permit movement of the assembly along the length of the support member. With the movable carriage 64 and drill holding bracket configured in this manner, rotational movement of feedshaft 42 is translated into longitudinal movement of carriage 62 and transferred to connecting bracket 64, guide member 66, and ultimately to drill mounting bracket 27. The length of travel of the assembly is approximately 11 inches in the optimal design.

Figure 6:
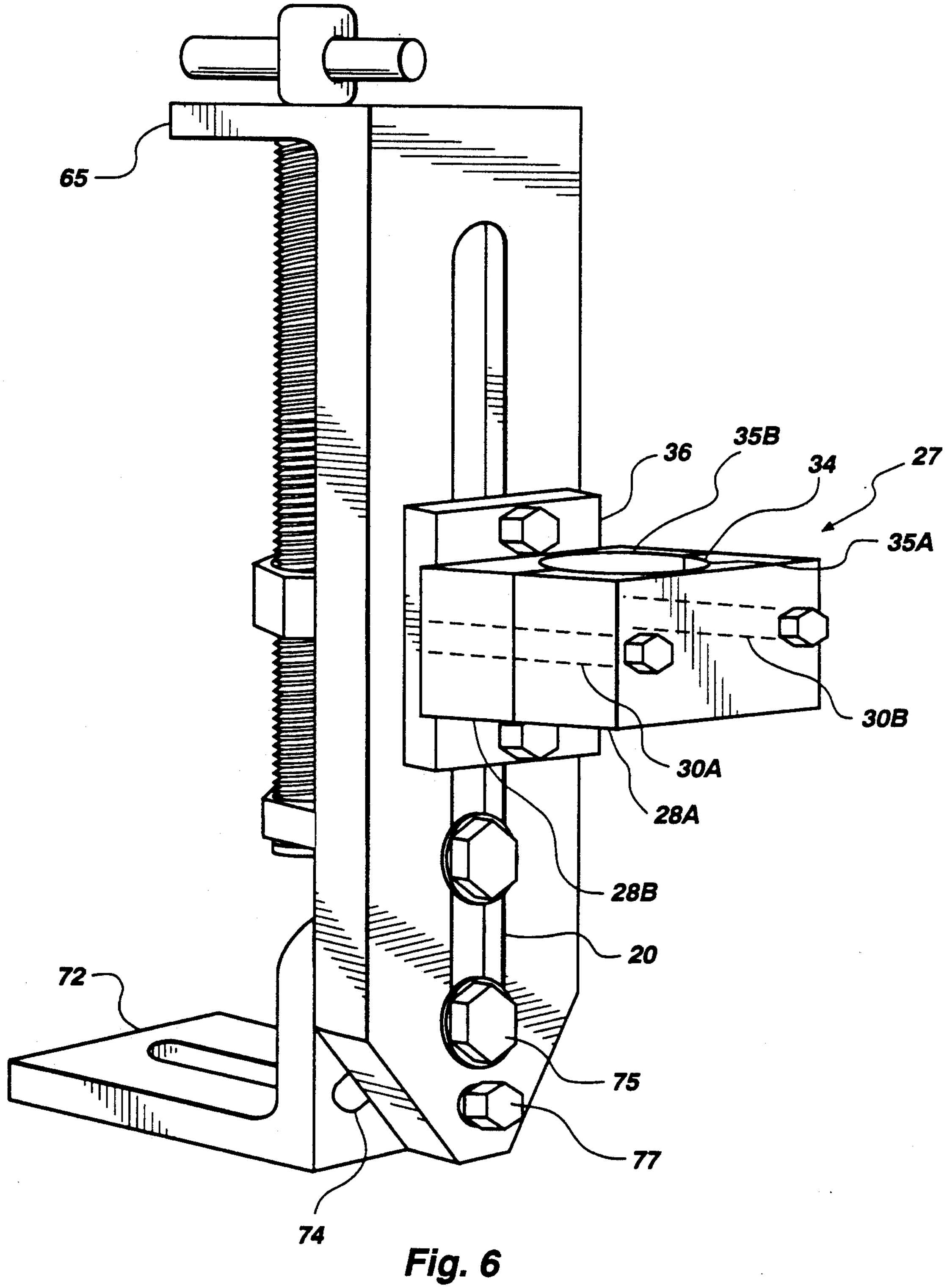
FIG. 6 is a perspective side view of an alternate embodiment of the instant invention having a vertically adjustable mounting bracket.

As shown in FIG. 6, an alternate embodiment of the drill holding mechanism includes a mounting means comprising an adjustable swivel mounting bracket 72. Swivel mounting bracket 72 may be attached to a workpiece by means of a bolt passed through slot 78 and into a bolt hole in the workpiece. The bracket may also be clamped to the workpiece or secured in some other suitable manner. Swivel mounting bracket 72 replaces mounting bracket 24 and mounts to support member 12 by means of a bolt 75 passing through an arcuate slot 74 and longitudinal slot 20, and a second bolt 77 passing through an aperture (not shown) in bracket 72 and longitudinal slot 20. Arcuate slot 74 facilitates vertical adjustment of support member 12 by permitting the drill holding mechanism to pivot around bolt 77. Bolt 75, passing through arcuate slot 74, slides through the slot during adjustment and may be tightened to secure the drill holding mechanism in the desired vertical position. Drilling operations can thus be conducted at a plurality of angles with respect to the surface of a workpiece.

Referring again to FIG. 1, during the drilling operation, it is necessary to urge the drilling tool into the surface of the workpiece. The drill holding mechanism accomplishes this by means of the drill feed means. Rotation of feedshaft 42 moves carriage 62, and consequently drill mount 27, toward the surface of a workpiece. As the drilling tool contacts the surface of a workpiece, the force generated by movement of the feed means is transferred through the drill mount 27 to the drilling tool. Since the support member and abutment member are bolted to the workpiece and cannot move upward with the force, the drilling tool is urged into the surface of the workpiece. The situation is similar to the drilling operation of a drill press.

In operation, the drill holding mechanism 10 may be mounted to the workpiece, indicated generally as 70, by passing a bolt or other suitable fastener through slot 26 and into a bolt hole in the workpiece. A limited amount of adjustment is afforded by the slack between the width of slot 26 and the diameter of the securing bolt. Substantially more adjustment is afforded by the length of slot 26. In the embodiment having an adjustable swivel mounting bracket, initial mounting of the drill holding mechanism is done in a similar manner. Further adjustment of the mechanism in the vertical direction, with respect to the workpiece, is possible when using the swivel mount. A drill may be secured into drill holder 27, and the mechanism adjusted so that a drilling tool is properly positioned over the drill site.

Urging the drilling tool into the workpiece is accomplished by turning the T-handle 61 at the distal end 46 of feedshaft 42. The journaled portion 48 of feedshaft 42 rotates in journal passageway 50 as carriage 62 moves along the threads of feedshaft 42 toward the proximal end 44. The guide member 66, closely associated with the width of channel 18, insures that the drilling motion is confined to the longitudinal axis 14. The drilling tool is urged into the surface of the workpiece by turning the T-handle 61 as previously described. When the drilling tool has proceeded into the workpiece to a sufficient degree, it may be removed by turning the T-handle 61 in the opposite direction so that carriage 62 moves back up feedshaft 42.

The embodiments hereinbefore illustrated are not intended to limit the scope of the claims which themselves recite those features which are regarded as essential to the invention.

What is claimed is:

1. A portable drill holding mechanism comprising:

a support member having a longitudinal axis, a recessed channel therein parallel with said longitudinal axis, and a slot disposed within said channel;

mounting means associated with said support member for mounting said mechanism to a workpiece;

a drill mounting bracket for securing a drill to said mechanism, said bracket moveable along said longitudinal axis of said support member;

drill feed means movably connected to said support member and movable bi-directionally along said longitudinal axis comprising, an abutment member structured to slidably fit into said channel and having a journal passageway and being positionally adjustable along said channel;

a feedshaft rotatably attached to said abutment member having a screw threaded external surface, a distal end adapted for use as a handle, and a proximal end adapted for journaled attachment into said journal passageway in said abutment member; and a moveable carriage having internal screw threads for threading engagement over said screw threaded external surface of said feedshaft such that rotation of said feedshaft brings about linear movement of said carriage along said longitudinal axis;

guide means connected to said moveable carriage and slidably disposed in said recessed channel for substantially confining movement of said carriage to linear movement along said longitudinal axis.

2. A drill holding mechanism comprising:

a support member having a longitudinal axis;

mounting means associated with said support member for mounting said mechanism to a workpiece;

a drill mounting bracket for securing a drill to said mechanism, said bracket moveable along said longitudinal axis of said support member;

guide means connected to said drill mounting bracket and movable along said longitudinal axis for confining movement of said drill mounting bracket to linear movement along said longitudinal axis; and drill feed means connected to said drill mounting bracket and movably connected to said support member for urging said drill mounting bracket toward and away from a workpiece comprising, an abutment member adjustably connectable to said support member along said longitudinal axis, a moveable carriage connected to said guide means and moveable along said longitudinal axis, and a feedshaft connected to said abutment member and disposed substantially parallel with said longitudinal axis, said feedshaft drivingly engageable with said movable carriage.

3. The drill holding mechanism in claim 2 wherein said mounting means is a swiveling mounting bracket which may be secured in a plurality of positions to adjust the vertical angle of said mechanism relative to a workpiece.

4. The drill holding mechanism in claim 2 including a slot disposed in said support member substantially parallel with said longitudinal axis.

5. The drill holding mechanism in claim 4 including a recessed channel disposed in said support member substantially parallel with said longitudinal axis, and said slot is disposed within said channel so as to define a shoulder between the edge of said slot and the wall of said channel.

6. The drill holding mechanism in claim 5 wherein said guide means includes a guide member fitting closely within said recessed channel and residing against said shoulder, said guide member being slidable bidirectionally in said recessed channel along said longitudinal axis.

7. The drill holding mechanism in claim 2 wherein said drill mounting bracket is a split yoke having two yoke halves, the union of said yoke halves defining an aperture in said bracket, said yoke halves being securable together.

8. The drill holding mechanism in claim 7 wherein said aperture is an oval shape.

9. A drill holding mechanism comprising:

a support member having a longitudinal axis and a slot therein substantially parallel with said longitudinal axis;

mounting means associated with said support member for mounting said mechanism to a workpiece;

a drill mounting bracket for securing a drill to said mechanism, said bracket moveable along said longitudinal axis of said support member;

guide means connected to said drill mounting bracket and movably associated with said slot in said support member for substantially confining movement of said drill mounting bracket to linear movement along said longitudinal axis; and drill feed means movably connected to said drill mounting bracket and movably connected to said support member for urging said drill mounting bracket toward and away from a workpiece comprising, an abutment member connected to said slot in said support member, and positionally adjustable along said longitudinal axis, a feedshaft rotatably connected to said abutment member and disposed substantially parallel with said longitudinal axis and having an external threaded surface, a moveable carriage having internal threaded surface in threaded engagement with said external threaded surface on said feedshaft whereby rotation of said feedshaft urges said carriage in linear movement along said longitudinal axis.

10. The drill holding mechanism in claim 9 wherein said mounting means is a swiveling mounting bracket which may be secured in a plurality of positions to adjust the vertical angle of said mechanism relative to a workpiece.

11. The drill holding mechanism in claim 9 wherein said guide means includes a guide member fitting closely within a recessed channel and residing against a shoulder, said guide member being slidable bidirectionally in said recessed channel along said longitudinally axis.

12. The drill holding mechanism in claim 9 wherein said drill mounting bracket is a split yoke having two yoke halves, the union of said yoke halves defining an aperture in said bracket, said yoke halves being securable together.

13. The drill holding mechanism in claim 12 wherein said aperture is an oval shape.

* * * * *